Figure 4:
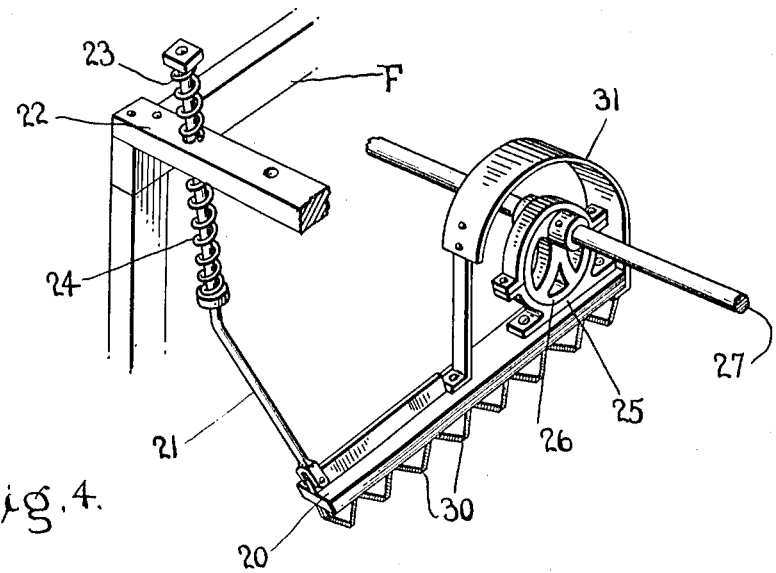

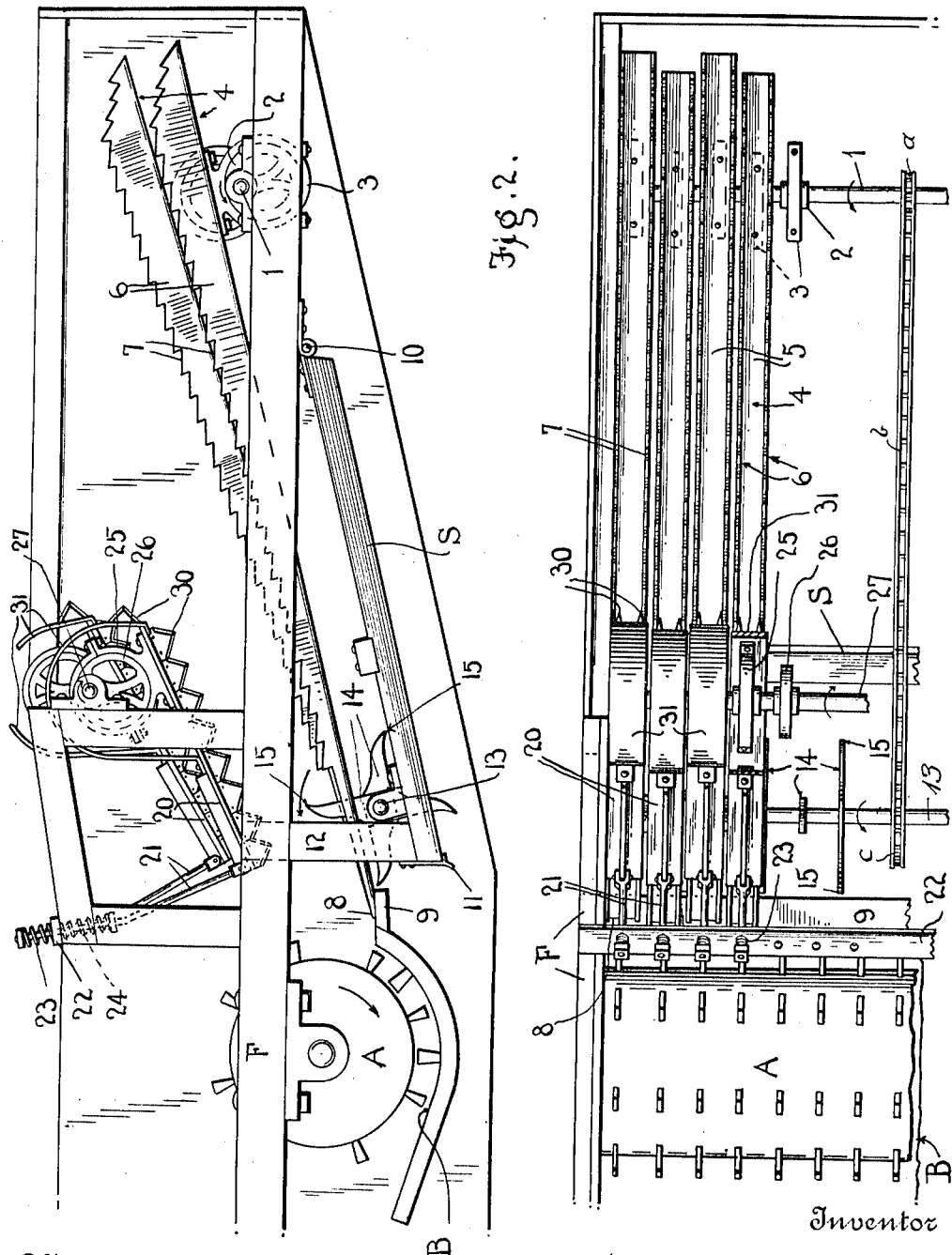

J. HOVEY.
FEEDER FOR THRESHING MACHINES.
APPLICATION FILED JUNE 13, 1912.

1,061,478.

Patented May 13, 1913.
2 SHEETS—SHEET 2.

Witnesses
L. B. James
N. L. Collamer

Inventor
Joseph Hovey
by H. B. Willson & Co.
Attorneys

UNITED STATES PATENT OFFICE.

JOSEPH HOVEY, OF FLORIDA, OHIO.

FEEDER FOR THRESHING-MACHINES.

1,061,478. Specification of Letters Patent. Patented May 13, 1913.

Application filed June 13, 1912. Serial No. 703,534.

*To all whom it may concern:*

Be it known that I, JOSEPH HOVEY, a citizen of the United States, residing at Florida, in the county of Henry and State of Ohio, have invented certain new and useful Improvements in Feeders for Threshing-Machines; and I do declare the following to be a full, clear, and exact description of the invention, such as will enable others skilled in the art to which it appertains to make and use the same.

This invention relates to threshing, and more especially to such feeders used therein as retard and regulate the passage of the grain therethrough; and the object of the same is to mount the retarding mechanism on a hinged sub-frame so that it can be dropped into view when needed. This object is accomplished by the construction hereinafter more fully described and claimed, and as shown in the drawings wherein—

Figure 3:
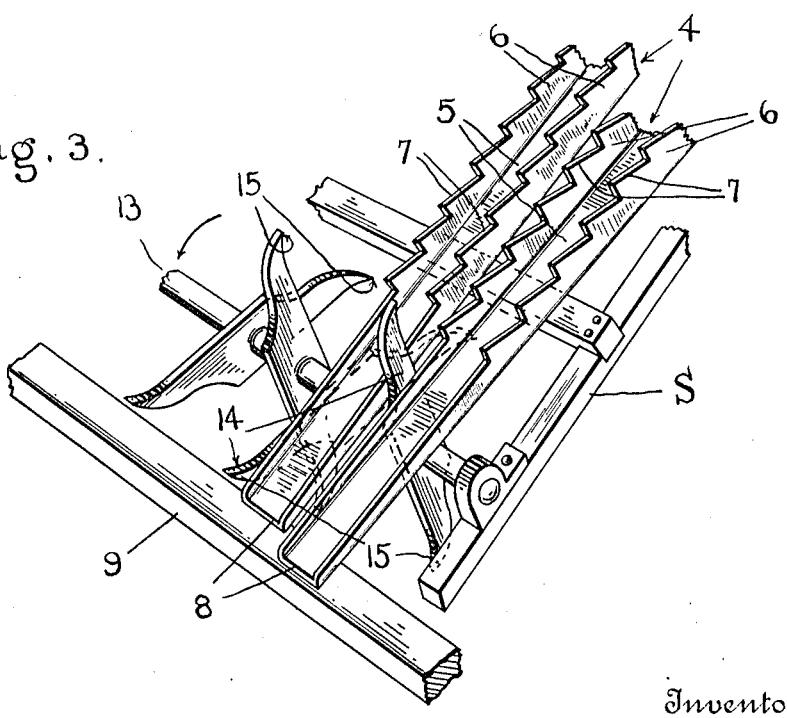

Figure 1 is a side elevation and Fig. 2 a plan view (partly in section) of this invention as applied to a threshing machine. Fig. 3 is an enlarged perspective detail of the lower ends of two of the pans, showing the rotation fingers or arms interposed between them. Fig. 4 is a perspective detail of one of the cutter bars and the mechanism for driving the same.

No novelty is claimed for the cylinder A, concave B, frame F, or subframe S. Journaled across the frame F is a shaft 1 carrying a series of eccentrics 2 surrounded by bands 3 which are alternately connected with the under side of pans 4, each of which has a flat bottom 5 and upturned sides 6 provided with teeth 7 along half their upper edges facing toward the lower end 8 of the pan, and said ends all slide upon a cross bar or block 9 located within the frame just forward of the concave B. The shaft and the eccentrics are rotated in the direction shown by the arrows, and the grain thrown onto the conveyer which these pans constitute is fed forward and downward to the cylinder and concave in a well known manner. The subframe S is hinged at 10 to the frame F beneath the pans and held raised in a suitable manner as by a catch 11 connecting it with the uprights 12 of the frame, and when this catch is loosened the subframe may be dropped to give access to the cylinder and the machinery contained within this space and which forms an essential feature of my invention.

Journaled across the subframe is a second shaft 13 standing below the various pans near their lower ends and above the subframe, and on this shaft are mounted two series of arms 14, each arm consisting of two fingers having points 15 at their extremities deflected in opposite directions and to the rear in the direction of rotation of the shaft 13. The arms of the series are arranged at various angles to each other, but preferably at right angles and in alternated position, so that in effect the shaft may be said to be provided with four sets of radially projecting fingers. The latter are long enough and are properly disposed so that they will reach up through the openings between the pans 4, and their points project for a considerable distance above the toothed upper edges 7 thereof, and an important detail of the construction and arrangement consists in the fact that the shaft 13 is rotated slower than the shaft 1. This may be accomplished in any suitable manner, but in Fig. 2 I have diagrammatically illustrated a rather small sprocket $a$ on the shaft I connected by a chain $b$ with a rather larger sprocket $c$ on the shaft 13, as typical of one means whereby the movement of the points 15 in the direction of the arrow is slower than the movement of the various teeth and the feed of the grain down the pans, and as a result the various arms and their points act as retarders to prevent the grain if loose or the bundle of grain from being fed too rapidly to the threshing mechanism.

The cutter which I preferably employ in connection with this device is disposed above the retarder just described, and by preference is provided with a series of cutter bars 20 disposed obliquely above the pans 4 and having their lower ends sustained by swinging arms 21, each passing upward loosely through an eye in a cross bar 22 with springs 23 and 24 above and below said bar so as to permit the arms to have some considerable movement up and down and laterally toward and from the threshing mechanism; and the upper ends of said bars 20 carry bands 25 surrounding eccentrics 26 which are fixed upon a shaft 27 rotating in the direction of the arrow, the eccentrics being alternately disposed as illustrated so that there are two sets of cutter bars moving in the same direction one after another as will be understood. These cutter bars carry teeth 30 projecting downward toward the pan upon which the grain is moving, the teeth being similar in construction to those employed in the ordinary cutting mechanism of mowing machines. Guards or hoods 31 may cover the eccentrics so as to protect them and the other parts of this mechanism from straw and chaff.

In operation the grain or bundles of grain to be threshed are fed upon the upper ends of the pans and carried downward and forward upon them by their vibratory movements, and as the upper sides of the bundles pass under the teeth 30 the bands are cut. The presence of the retarder at the lower end of the conveyer with its fingers projecting between said pans and moving downward toward the cylinder at a slower speed than the grain is advancing, retards its progress toward the cylinder as I have found by experiment, and the presence of the cutter just above the point where the discharge occurs and having its teeth also moving toward the cylinder at the same time that the retarding teeth are moving in that direction, prevents the clogging of the grain at this point within the machine where the space for its passage is smallest. The general result is particularly efficacious in preventing the clogging of the cylinder and concave.

I do not limit myself to the proportions or the materials of parts, and reserve the right to make such changes as come within the spirit of this invention.

What is claimed as new is:—

In a feeder for threshing machines, the combination with the main frame, of the cylinder and concave near one end thereof, a shaft across the frame near its other end, the conveyer whose lower end is slidably mounted on the concave, and means for giving its upper end a gyratory motion by the rotation of said shaft; of uprights depending from the frame between said shaft and cylinder, a sub-frame whose upper end is hinged to the frame, a catch on one of said uprights engaging the lower end of said sub-frame when the latter is raised, a shaft mounted in bearings on said sub-frame, and a retarder fast on said shaft and having its fingers projecting through said conveyer when the sub-frame is latched in position.

In testimony whereof I have hereunto set my hand in presence of two subscribing witnesses.

JOSEPH HOVEY.

Witnesses:
 P. C. PRENTISS,
 VIDA METZ.